Figure 1:
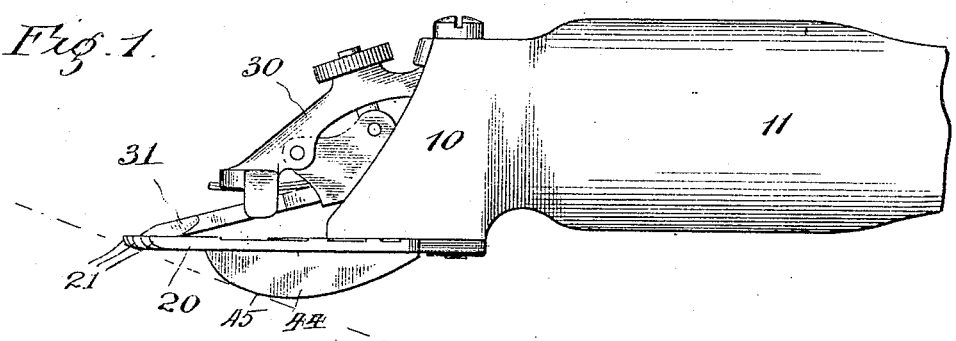

No. 869,500. PATENTED OCT. 29, 1907.
T. A. MARTIN.
SHEEP SHEARING MACHINE.
APPLICATION FILED SEPT. 1, 1906.

Witnesses:
Wm. P. Bond
Herbert Wohl

Inventor:
Thomas A. Martin.
by Charles O. Shervey
Atty

UNITED STATES PATENT OFFICE.

THOMAS A. MARTIN, OF CHICAGO, ILLINOIS.

SHEEP-SHEARING MACHINE.

No. 869,500.    Specification of Letters Patent.    Patented Oct. 29, 1907.

Application filed September 1, 1906. Serial No. 332,971.

*To all whom it may concern:*

Be it known that I, THOMAS A. MARTIN, a citizen of the United States, residing in the city of Chicago, in the county of Cook and State of Illinois, have invented certain new and useful Improvements in Sheep-Shearing Machines, of which the following is a full, clear, and exact description.

My invention relates to certain new and useful improvements in shearing machines and more particularly to the provision of an attachment to a certain class of shearing machines whereby the cutting or shearing device thereof may be held in an operative position for cutting away more or less wool or hair as is desired.

It is frequently desirable, particularly in shearing sheep, to leave more of the wool upon the back and sides than upon the under side and legs, but with the ordinary shearing or clipping machine this is practically impossible because of the fact that the shears must be held in close contact with the skin to prevent the shears from running out to the surface of the wool. This is particularly the fact with shearing devices which contain combs that act as the stationary cutters and movable cutters that contain a number of cutting blades equal to the number of teeth on the comb. In using a machine of this kind the wool falls in between the teeth of the comb and inasmuch as the teeth upon the movable cutter are traveling through the spaces say one half of the time the wool cannot reach the seats of the notches between the teeth and the wool is bent forward by the forward movement of the shears and piled up over the skin of the animal, so that the shears tend to move out towards the outer edge. This difficulty has been overcome by constructing a shearing machine in which one, or say two, cutting teeth are provided upon the movable cutter which travel back and forth across the teeth of the stationary cutter very rapidly and a machine of this type has been heretofore patented to me on March 10th, 1903 and numbered, 722,313. In this machine the wool fills up the spaces between the teeth because of the fact that the movable cutters travel at a high rate of speed and remain in any given space between the teeth during a small portion of the time, the wool being sheared off before it is bent down upon the skin and the necessity of holding the point or front end of the comb snugly upon the skin is thus avoided.

This invention has been designed to produce a device which may be applied to sheep shearing machines whereby a firm pressure may be had upon the skin at all times, still permitting the point or front end of the comb to be raised away from the skin to leave more stubble or to be swung down against it so as to leave very little stubble.

To such end my invention consists in certain novel features of construction and arrangement, a description of which will be found in the following specification and the essential features more definitely pointed out in the claims appended hereto.

The invention is clearly illustrated in the drawings furnished herewith in which

Figure 2:
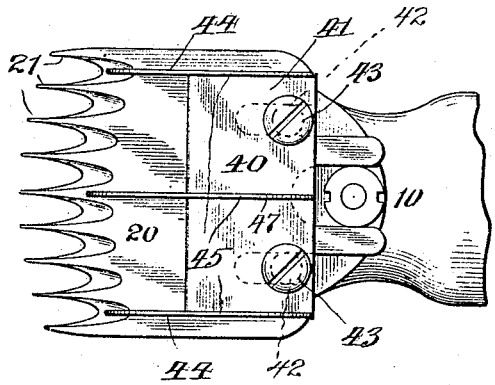
Figure 3:
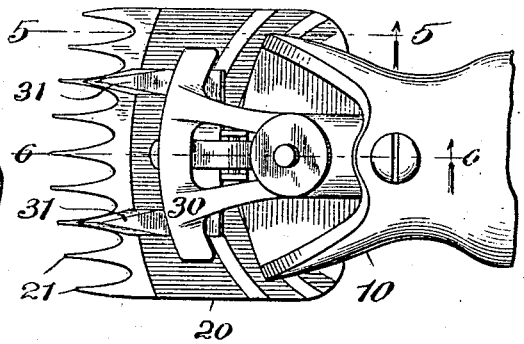
Figure 4:
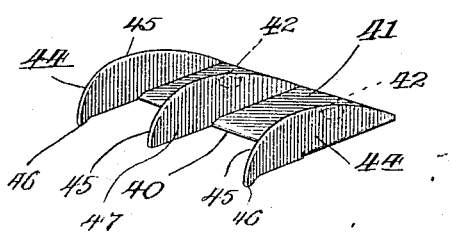
Figure 5:
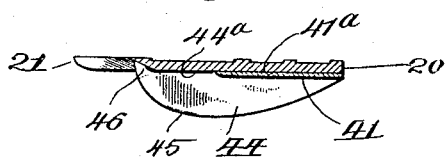
Figure 6:
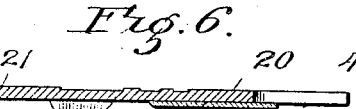
Figure 7:
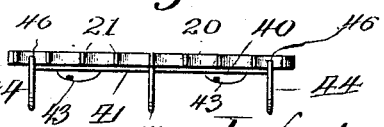

Figure 1 is a side view of the head of a shearing machine with my attachment secured thereto. Fig. 2 is an under plan view of the same. Fig. 3 is a plan view. Fig. 4 is a perspective view of the attachment alone. Fig. 5 is a vertical longitudinal section of the comb and attachment alone taken on the line 5—5 of Fig. 3. Fig. 6 is a similar section taken through the comb and attachment alone on the line 6—6 of Fig. 3, and Fig. 7 is an end elevation of the comb and attachment alone.

Referring to these drawings, 10 represents the head of a shearing machine and 11 the shank which forms the handle by means of which the device is held in operation. Upon the lower end of the head is secured a comb 20 which forms one member of the cutting or shearing device and which contains a number of pointed teeth 21 upon its forward end that are adapted to pass through the wool and divide the same into strands. A cutter lever 30 is pivotally mounted in the head 10 and carries a pair of cutter teeth or blades 31 which travel back and forth across the teeth 21 of the stationary cutter and sever the strands that fall between said teeth. The number of blades 31 is very small as compared with the number of teeth 21 upon the comb and each blade 31 is arranged to travel across that number of teeth on the comb as is the proportion of the number of cutter blades 31 to the number of teeth 21. The cutter lever 30 is caused to oscillate back and forth by suitable operating mechanism, not shown, which mechanism may consist of any of the well known forms of devices operated either by compressed air, by a flexible shaft or by hand, and forms no part of my invention, broadly speaking. The construction, thus far described, is that of the ordinary shearing machine which is preferably used for shearing sheep. In operation the comb 20 is pressed firmly in contact with the skin and pushed along the same, the oscillatory cutter shearing the wool away as the machine moves along.

Referring now to Fig. 4, 40 represents the attachment and as shown it comprises a runner-plate 41 that contains screw holes 42 through which screws 43 (see Fig. 2) are passed to secure the attachment to the machine. The two ends of the plate 41 are bent upwards to form runner-blades 44, the bearing edges 45 of which extend in curved lines from the rear edge of the plate 41 to a suitable point, then curving back beyond the plate 41 and terminating at the points 46. The points 46 extend up into two of the spaces between the teeth 21 of the comb 20 and bear snugly against the end wall between two adjacent teeth, so as to prevent the wool from being drawn underneath and between the runner and comb. A central runner 47 is secured to the plate 41 in any suitable manner and contains the same general contour as the side runners 44, with the exception of point 46, the front end of this runner terminating upon the under side of a tooth instead of falling in between two adjacent teeth as does the side runners 44. The edges 44ᵃ and face 41ᵃ of the runners and plate, respectively, are flush with each other and lie in close contact with the under side of the comb 20 so as to prevent the wool from being drawn in between them. The attachment provides a runner like bearing for the machine by means of which the position of the cutters may be determined and maintained at all times. The shape or contour of the runner blades is such that when the machine is held at an angle to the surface of the skin the cutters are brought nearer the surface than when the machine is held approximately parallel therewith. The runner blades are very thin so that they may plow their way through the stubble and not bend the same down, as the comb passes over it. The thin blades do not extend to the front edges of the teeth of the comb but rather from the bases of the teeth, the object being to avoid the collection upon them of any large quantity of gum from the animal which is being operated upon. The thin blades provide runners for the machine, and unobstructed passages are left between the blades, for the free passage of the stubble therethrough, which is an exceedingly important feature in a sheep shearing machine.

In using the machine with my attachment applied thereto, the runner blades are held in close contact with the skin and being very narrow, cut paths through the wool so that there is no tendency for the machine to climb. When it is desired to make a close cut the machine is held in an inclined position with respect to the skin, such a position being indicated in Fig. 1 by the position of the machine with respect to the dotted line a, the cutters in this case being brought quite close to the skin. When it is desired to leave a long stubble the machine is brought into a position approximately parallel with the surface of the skin, the runner blades causing the cutters to swing farther away from the skin. The contour of the bearing edges of the runner blades enables the machine to be held closely in contact with the skin and in any desired angle with respect to the surface thereof, so that it is possible to leave a long or short stubble.

I realize that other forms of shearing mechanism may be used and while I have shown and described the runner device in the form of an attachment adapted to be secured to a certain class of shearing or clipping machines, I do not wish to be understood as confining my invention to an attachment alone, as a shearing machine might be constructed to include means whereby it may be caused to operate in substantially the same way and for the same purpose as does a machine which contains the invention in the form of an attachment. Furthermore, the precise construction of the runner is immaterial to my invention, and one or more of the runners may be omitted without departing from the spirit of my invention. By the term "runner" I wish to be understood as having reference to any sort of bearing device which acts as a foot and furnishes means whereby the machine may be pressed firmly upon the skin of the animal while clipping the wool, and so constructed and arranged that the position of the shearing or clipping mechanism with respect to the skin may be changed at will to shear away more or less wool without removing the foot or runner device away from the skin of the animal. I do not wish to be understood as intending to include as "runners" any sort of projections, ridges, or ribs that may be placed upon the under side of the cutters, but rather such devices as will penetrate, or rather cut their way through the stubble, so that they may be kept in contact with the skin, regardless of the angular position of the cutters, and the comb may pass freely over the stubble without riding upon it.

I claim as new and desire to secure by Letters Patent:

1. A foot for sheep shearing machines containing one or more thin outwardly projecting runner blades, the spaces between which are unobstructed from end to end.

2. A foot for sheep shearing machines, comprising a runner plate adapted to be removably secured to the machine, and one or more thin outwardly projecting runner blades, the spaces between which are unobstructed from end to end.

3. In a sheep shearing machine, the combination with a stationary cutter having a large number of teeth, and a suitably operated movable cutter coöperating therewith, and having a small number of cutter blades, each of said blades being adapted to traverse a number of teeth on each side of the teeth adjacent to the blade, of a runner device secured to the stationary cutter, having a plurality of outwardly projecting runner blades, the spaces between which are unobstructed from end to end.

4. The combination with a shearing machine, of one or more thin runner blades having outwardly bowed running edges secured thereto, the spaces between the blades being unobstructed from end to end.

5. The combination with a shearing machine having a stationary cutter, and a movable cutter coöperating therewith, of a plurality of thin runner blades projecting outward from the under side of the stationary cutter, the spaces between which are unobstructed from end to end.

6. The combination with a shearing machine having a stationary cutter containing a plurality of teeth about its forward edge, and an oscillatory cutter having cutter blades of less number than the number of teeth on the stationary cutter, of a plurality of thin runner blades projecting outward from the under side of the stationary cutter, the spaces between which are unobstructed from end to end.

7. The combination with a shearing machine having a stationary cutter and a relatively movable cutter, of a runner plate secured to the under side of the stationary cutter, having a plurality of thin runner blades extending longitudinally of the machine and secured to the stationary cutter, the spaces between which are unobstructed from end to end.

8. The combination with a shearing machine having relatively stationary and movable cutters, of a runner device secured to the stationary cutter containing a plurality of thin longitudinally extending runner blades; the bearing edges of which are curved outward from their base and the sides of which have unobstructed passageways between them.

9. The combination with a shearing machine having relatively stationary and movable cutters, of a runner attachment comprising runner blades secured to the under side of the stationary cutter and adapted to form a traveling fulcrum for the cutters, said runner attachment being constructed and arranged to leave unobstructed passageways between the blades.

10. The combination with a shearing machine having relatively stationary and movable cutters, the stationary cutter of which contains a plurality of teeth, of a runner device curved upon the under side of the stationary cutter and having a plurality of thin runner blades, the bearing edges of which are bowed outward from the stationary cutter and one end of which extends well up into and between the two adjacent teeth of the stationary cutter.

THOMAS A. MARTIN.

Witnesses:
  CHAS. O. SHERVEY,
  H. O. DAVIS.